United States Patent
Spies et al.

(10) Patent No.: US 12,000,923 B2
(45) Date of Patent: Jun. 4, 2024

(54) SENSOR FUSION WITH ALTERNATING CORRESPONDENCE ANALYSIS OF SENSOR DATA

(71) Applicant: Carl Zeiss AG, Oberkochen (DE)

(72) Inventors: Daniel Spies, Schwaebisch-Gmuend (DE); Matthias Karl, Königsbronn (DE)

(73) Assignee: Carl Zeiss AG, Oberkochen (DE)

( * ) Notice: Subject to any disclaimer, the term of this patent is extended or adjusted under 35 U.S.C. 154(b) by 593 days.

(21) Appl. No.: 17/264,476

(22) PCT Filed: Jul. 31, 2019

(86) PCT No.: PCT/EP2019/070633
§ 371 (c)(1),
(2) Date: Jan. 29, 2021

(87) PCT Pub. No.: WO2020/025674
PCT Pub. Date: Feb. 6, 2020

(65) Prior Publication Data
US 2021/0319271 A1      Oct. 14, 2021

(30) Foreign Application Priority Data
Aug. 1, 2018   (DE) .......................... 102018118666.5

(51) Int. Cl.
*G01S 13/86*      (2006.01)
*G06F 18/2113*   (2023.01)
(Continued)

(52) U.S. Cl.
CPC ........ *G01S 13/862* (2013.01); *G06F 18/2113* (2023.01); *G06F 18/251* (2023.01); *G06N 20/00* (2019.01); *G06V 20/20* (2022.01)

(58) Field of Classification Search
CPC .... G06F 18/25; G06F 18/2113; G06F 18/251; G01S 13/862; G01S 13/865; G01S 13/867; G01S 17/86; G06N 20/00; G06V 20/20
See application file for complete search history.

(56) References Cited

U.S. PATENT DOCUMENTS 7,460,951 B2     12/2008 Altan et al.
10,217,120 B1 *   2/2019 Shin .................... G06Q 30/0201
(Continued)

FOREIGN PATENT DOCUMENTS

CN    102147468 A    8/2011
CN    103631268 A    3/2014
(Continued)

OTHER PUBLICATIONS

International Search Report from corresponding International Patent Application No. PCT/EP19/70633, dated Oct. 14, 2019.
(Continued)

*Primary Examiner* — Dung Hong
(74) *Attorney, Agent, or Firm* — KUSNER & JAFFE

(57) ABSTRACT

Sensor data are received from a multiplicity of sensors, wherein the multiplicity of sensors image a common scene using a multiplicity of measurement modalities. For each sensor of the multiplicity of sensors, at least one corresponding feature is determined in the respective sensor data and corresponding performance specification data are also obtained. In addition, mutual correspondence analysis between the features of the sensor data is carried out taking into account the corresponding performance specification data. Sensor fusion is also carried out on the basis of the correspondence analysis.

16 Claims, 3 Drawing Sheets

(51) Int. Cl.
    *G06F 18/25*     (2023.01)
    *G06N 20/00*     (2019.01)
    *G06V 20/20*     (2022.01)

(56) References Cited

U.S. PATENT DOCUMENTS

| | | |
|---|---|---|
| 10,534,368 B2 | 1/2020 | Sethu et al. |
| 2011/0074931 A1 | 3/2011 | Bilbrey et al. |
| 2016/0129593 A1* | 5/2016 | Wolowelsky ............. B25J 5/00 901/1 |
| 2017/0197311 A1 | 7/2017 | Garcia et al. |
| 2019/0049565 A1* | 2/2019 | Ben-Bassat ........... G01S 7/4917 |

FOREIGN PATENT DOCUMENTS

| | | | |
|---|---|---|---|
| DE | 10308168 A1 | 4/2004 | |
| DE | 102006045115 A1 | 4/2007 | |
| DE | 102009006113 A1 * | 9/2009 | ........... G01S 13/726 |
| DE | 102009006113 A1 | 9/2009 | |
| DE | 102009033853 A1 | 5/2010 | |
| DE | 102012023746 A1 | 6/2014 | |
| DE | 102018115198 A1 | 12/2018 | |
| JP | 3564897 B2 * | 9/2004 | |
| WO | WO-2016187759 A1 * | 12/2016 | ........... B64C 39/024 |

OTHER PUBLICATIONS

Ye, Mao, et al.: "3D reconstruction in the presence of glasses by acoustic and stereo fusion", IEEE Conference on Computer Vision and Pattern Recognition, 2015.
Office Action (with English translation) dated Mar. 28, 2024 in related/corresponding Chinese Patent Appl. No. 201980051067.9.

* cited by examiner

SENSOR FUSION WITH ALTERNATING CORRESPONDENCE ANALYSIS OF SENSOR DATA

FIELD OF THE INVENTION

Various examples of the invention generally relate to the sensor fusion of sensor data from a plurality of sensors.

BACKGROUND OF THE INVENTION

The reliable and robust measurement of scenes—for example of interiors or roads—is desirable in many fields of application. One example relates to the control of the movement of a robot within a scene. If the scene is measured accurately and reliably, collisions of the robot with objects in the scene can be avoided and optimum paths can be planned.

In various examples, sensor fusion of sensor data from a plurality of sensors, which each image a common scene using a plurality of measurement modalities, is used to increase the accuracy with which the scene is measured. An exemplary technique is described, for instance, in: YE, Mao, et al. 3D reconstruction in the presence of glasses by acoustic and stereo fusion. In: Proceedings of the IEEE Conference on Computer Vision and Pattern Recognition. 2015. Pages 4885-4893.

SUMMARY OF THE INVENTION

There is a need for improved sensor fusion techniques. In particular, there is a need for sensor fusion techniques which make it possible to accurately and reliably measure the scene.

This object is achieved by the features of the independent patent claims. The features of the dependent patent claims define embodiments.

In one example, a computer-implemented sensor fusion method comprises receiving sensor data from a multiplicity of sensors. In this case, the multiplicity of sensors image a common scene using a multiplicity of measurement modalities. The method also comprises determining at least one corresponding feature in the respective sensor data from a corresponding sensor of the multiplicity of sensors. The method also comprises obtaining corresponding performance specification data for each sensor of the multiplicity of sensors. The method also comprises carrying out mutual correspondence analysis between the features of the sensor data, wherein the corresponding performance specification data are taken into account in this case. The method also comprises carrying out the sensor fusion on the basis of the correspondence analysis.

A computer program or a computer program product comprises a program code which can be executed by at least one processor. The execution of the program code causes the at least one processor to carry out a sensor fusion method. The method comprises receiving sensor data from a multiplicity of sensors. In this case, the multiplicity of sensors image a common scene using a multiplicity of measurement modalities. The method also comprises determining at least one corresponding feature in the respective sensor data from a corresponding sensor of the multiplicity of sensors. The method also comprises obtaining corresponding performance specification data for each sensor of the multiplicity of sensors. The method also comprises carrying out mutual correspondence analysis between the features of the sensor data, wherein the corresponding performance specification data are taken into account in this case. The method also comprises carrying out the sensor fusion on the basis of the correspondence analysis.

An apparatus comprises at least one processor and a memory. The at least one processor is configured to load a program code from the memory and to carry out the following steps on the basis of the execution of the program code: receiving sensor data from a multiplicity of sensors, wherein the multiplicity of sensors image a common scene using a multiplicity of measurement modalities; for each sensor of the multiplicity of sensors: determining at least one corresponding feature in the respective sensor data; for each sensor of the multiplicity of sensors: obtaining corresponding performance specification data; carrying out mutual correspondence analysis between the features of the sensor data taking into account the corresponding performance specification data; and carrying out the sensor fusion on the basis of the correspondence analysis.

The features set out above and features that are described below may be used not only in the corresponding combinations explicitly set out, but also in further combinations or in isolation, without departing from the scope of protection of the present invention.

DETAILED DESCRIPTION OF THE INVENTION

Figure 1:
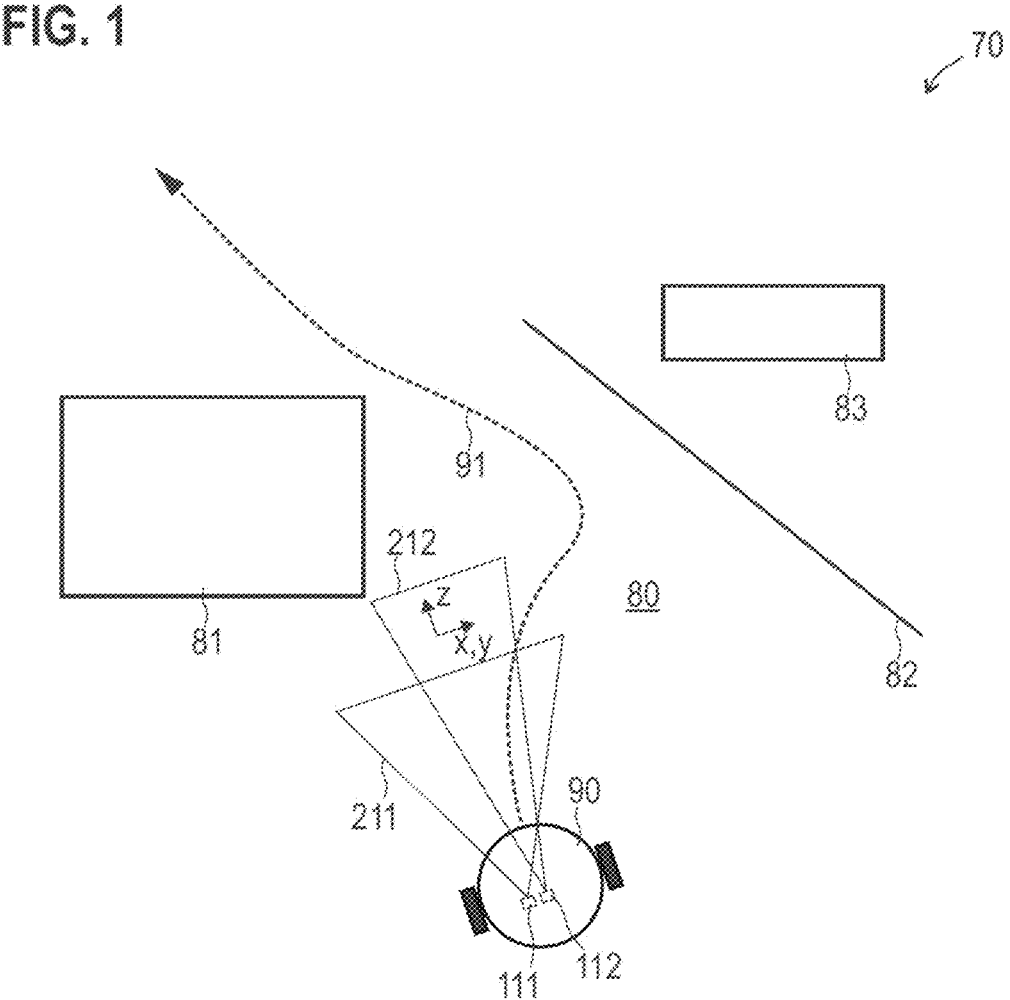
FIG. 1 schematically illustrates a scene having a plurality of objects, in which a robot moves according to various examples.

The properties, features and advantages of this invention described above and the way in which they are achieved will become clearer and more clearly understood in association with the following description of the exemplary embodiments which are explained in greater detail in association with the drawings.

The present invention is explained in greater detail below on the basis of preferred embodiments with reference to the drawings. In the figures, identical reference signs denote identical or similar elements. The figures are schematic representations of various embodiments of the invention, Elements illustrated in the figures are not necessarily illustrated as true to scale. Rather, the various elements illustrated in the figures are rendered in such a way that their function and general purpose become comprehensible to the person skilled in the art. Connections and couplings between functional units and elements as illustrated in the figures can also be implemented as indirect connections or couplings. A connection or coupling can be implemented in a wired or wireless manner. Functional units can be implemented as hardware, software or a combination of hardware and software.

Techniques in connection with sensor fusion are described below, Sensor fusion relates to the combining of sensor data for a multiplicity of sensors. In this case, sensor fusion may relate to a multiplicity of sensors which image a common scene using a multiplicity of measurement modalities. In other words, different sensors can therefore image the scene using different measurement modalities. This may mean that measurement fields of the various sensors have an overlapping region.

As a general rule, the techniques described herein can be used in a wide variety of fields of application. For example, the movement of a robot in the scene could be controlled on the basis of sensor fusion. For example, mobile robots can be used and trajectories of the mobile robots can be planned on the basis of sensor fusion. In another example, a robot which is mounted in a stationary manner and has one or more articulated robot arms could be used. Robot arms can then be moved on the basis of sensor fusion. For example, it is possible to monitor whether the robot arm approaches an operator or another restricted area.

As a general rule, the number and type of sensors taken into account in connection with sensor fusion can vary in different implementations. A range of between 2 and 10 sensors can typically be taken into account in sensor fusion, for example. Exemplary sensors include active sensors, for example ToF (time of flight) sensors; radar sensors; lidar sensors, for example 1-D/2-D scanned/rotated or flash lidar with fan illumination; ultrasonic sensors, for example individual sensors or an array of ultrasonic sensors. Alternatively or additionally, it is also possible to use passive sensors, for instance cameras or stereo cameras. It is possible to use cameras in the infrared spectrum, in the visible spectrum, or in the ultraviolet spectrum. Monocular cameras or stereo cameras can be used. It is also possible to use active cameras which project a pattern—for example a line pattern etc.—and can determine a surface topography therefrom. It is clear from these examples that the measurement modality varies depending on the sensor type. For example; radar sensors and lidar sensors use electromagnetic waves in different wavelength ranges; radar sensors use waves in the gigahertz range, for example, and lidar sensors typically use waves in the infrared range, for instance at 950 nm or in the C band. Ultrasonic sensors use density fluctuations of the air rather than electromagnetic waves as the measurement modality.

As a general rule, both sensors which are stationary with respect to the scene and movable sensors can be used. For example, one or more sensors could be mounted on a robot, the movement of which is controlled on the basis of sensor fusion; alternatively or additionally, one or more sensors could be mounted in a stationary manner with respect to the robot.

The sensor data may also vary depending on the sensor. The sensor data image the scene. Depending on the measurement modality, different physical observables are used to image the scene. For example, the information content of the sensor data may vary. Some sensor data may not have any spatial resolution: for example, an ultrasonic sensor could provide only an individual distance value, but not a lateral resolution. Other sensor data may have a 1-D resolution: this would be the case, for example, in one-dimensionally scanned lidar sensors. Yet other sensor data may have a 2-D resolution, for example two-dimensionally scanned lidar sensors or camera images or radar sensors based on 2-D phase-coherent transmission arrays. In this case, the resolution of the sensor data may vary from sensor to sensor: for example, radar sensors typically have a lower number of lateral image points than lidar sensors.

Various examples are based on the insight that individual sensors may provide incorrect or erroneous information depending on the scene. One example relates to the use of a camera as a sensor, for example: a camera typically cannot detect objects which are transparent in the corresponding wavelength range or can detect them only to a limited extent. For example, a pane of glass cannot be detected or can be detected only to a, limited extent by means of a camera. On the other hand, an ultrasonic sensor, for example, can detect a pane of glass particularly well. A further example relates to a mirror: for example, the camera could detect an object reflected in the mirror, but not the mirror itself, and could thus provide erroneous information relating to the scene. On the other hand, the mirror might not have particularly high reflectivity for radar waves, for example, and could therefore be reliably detected by means of a radar sensor. A further example relates to the limited range of passive cameras in the absence of illumination of the scene, for example. Another example relates to the reduced range of light-based sensors in the case of smoke or fog.

It may therefore often be desirable to validate the sensor data from the various sensors. In this case, various examples described herein are based on the insight that it is often impossible or is possible only to a limited extent to validate sensor data from a sensor only on the basis of the sensor data themselves. Therefore, techniques which relate to validation of sensor data in connection with sensor fusion, by taking into account the availability of a multiplicity of sensors which image a common scene using a multiplicity of measurement modalities, are described below.

In reference implementations, sensor data from different sensors are often evaluated separately. Obstacle detection, for example, is then based on a weighted combination of the sensor data as sensor fusion. Weighting can be carried out, for example, with respect to the probability of the obstacle existing. In such reference implementations which are described, for example, in US 2017/0 197 311 A1, the scene is often perceived only to a limited extent, which can result in inaccuracies or errors when controlling the movement of a robot, for example.

In order to eliminate such disadvantages, it is possible to determine at least one corresponding feature in the respective sensor data for each sensor of the multiplicity of sensors. It is then possible to carry out mutual correspondence analysis between the features of the sensor data. It is therefore possible to compare, for example, whether a feature determined in first sensor data is also present in second sensor data.

Such mutual correspondence analysis may make it possible to validate the different sensor data. For example, a positive validation of the first sensor and of the second sensor can be assumed with a high degree of probability if the feature determined in the first sensor data is also determined in the second sensor data (and possibly also the other way round), that is to say if the first sensor data correspond to the second sensor data.

However, the situation may sometimes occur in which there is no or only limited correspondence between the sensor data from two different sensors. This may be for different reasons: a first reason is a fault in the operation of the first sensor or of the second sensor. A sensor could be damaged. A second reason is the non-existent or limited possibility of capturing a particular feature by means of the measurement modality of the first sensor or of the second sensor. For example, objects which are transparent for visible light often cannot be captured or can be captured only to a limited extent by conventional cameras.

Techniques which make it possible to distinguish between these two causes of discrepancies between the sensor data, which are detected during the mutual correspondence analysis of features of the sensor data, are described below.

For this purpose, corresponding performance specification data can also be obtained for each sensor of the multiplicity of sensor data according to various examples. It is then possible to carry out the mutual correspondence analysis between the features of the various sensor data taking into account the corresponding performance specification data. The sensor fusion can then be carried out on the basis of the correspondence analysis.

Generally, the performance specification data can describe particular capabilities of the respective sensor for imaging features. The performance specification data may therefore be indicative of at least one limitation of the respective measurement modality for imaging features with particular properties.

The performance specification data can therefore be generally determined on the basis of the corresponding measurement modalities. The performance specification data may be predefined.

The performance specification data for a camera could describe, for example, the fact that the camera cannot image objects with a high transparency in the corresponding spectral range or can image them only to a limited extent. The performance specification data for an ultrasonic sensor could describe, for example, the fact that objects which are at a distance of more than 10 m from the ultrasonic sensor cannot be imaged or can be imaged only to a limited extent by the ultrasonic sensor—that is to say the performance specification data can generally describe a range. The performance specification data for an ultrasonic sensor could describe, for example, the fact that objects which have a lateral extent (perpendicular to the depth measurement direction) of less than 5 cm cannot be imaged or can be imaged only to a limited extent by the ultrasonic sensor—that is to say the performance specification data can generally describe a resolution. The performance specification data could also describe, for example, the fact that surfaces of objects which are oriented in a particular manner—for example with respect to a position and/or orientation (pose) of the respective sensor—cannot be imaged or can be imaged only to a limited extent. One example relates, for example, to surfaces which are tilted with respect to the direct connecting line between the surface and the ultrasonic sensor and deflect the sound waves in a different direction, away from the ultrasonic sensor. Accordingly, even a LIDAR sensor cannot detect tilted, reflective surfaces or can detect them only to a limited extent. This corresponds to so-called stealth techniques in connection with radar sensors. Such properties and other properties, in particular including material properties of a surface of the object, can be taken into account in connection with the reflectivity of the object. For example, LIDAR sensors cannot detect particular objects which have particularly little reflectivity at a distance.

In more general terms, it would therefore be possible for the at least one limitation indicated by the performance specification data to comprise a lower threshold value for a lateral extent of objects in the scene. Alternatively or additionally, it would also be possible for the at least one limitation indicated by the performance specification data to comprise geometrical orientation of objects in the scene. Sometimes, it would be possible for this geometrical orientation to be parameterized on the basis of a pose of the corresponding sensor with respect to the object. Alternatively or additionally, the at least one limitation could also comprise the reflectivity of a surface of an object in the scene.

Discrepancies between features determined in different sensor data can be assigned to limitations of the performance specification of the respective sensors by taking into account the performance specification data during the mutual correspondence analysis. This can then be taken into account during sensor fusion. This enables particularly accurate and robust sensor fusion.

FIG. 1 illustrates an exemplary system 70. A mobile robot 90 moves within a scene 80. The scene 80 comprises a plurality of objects 81-83, for instance solid obstacles 81 and 83 and a pane of glass 82. It is evident from FIG. 1 that the obstacle 83 is arranged behind the pane of glass 82 with respect to the robot 90.

There are two sensors 111, 112. The sensors 111, 112 in the example in FIG. 1 are mounted on the robot 90. However, it would generally be possible for stationary sensors to be used as an alternative or in addition to such mobile sensors.

The sensors 111, 112 each have a corresponding measurement region 211, 212. The measurement regions 211, 212 have a particular extent in the depth measurement direction (Z direction). The measurement regions 211, 212 also have a particular extent in the lateral direction (X direction and Y direction). Particular parameters in connection with the measurement regions 211, 212 may be included, for example, within the scope of corresponding performance specification data for the sensors 111, 112.

It is possible to carry out sensor fusion for sensor data from the sensors 111, 112. The movement of the robot 90 in the scene 80 can then be controlled on the basis of the sensor fusion. For example, the trajectory 91 could be planned, such that a collision with the objects 81-83 is avoided.

Details in connection with the sensor fusion are described in connection with FIG. 2.

Figure 2:
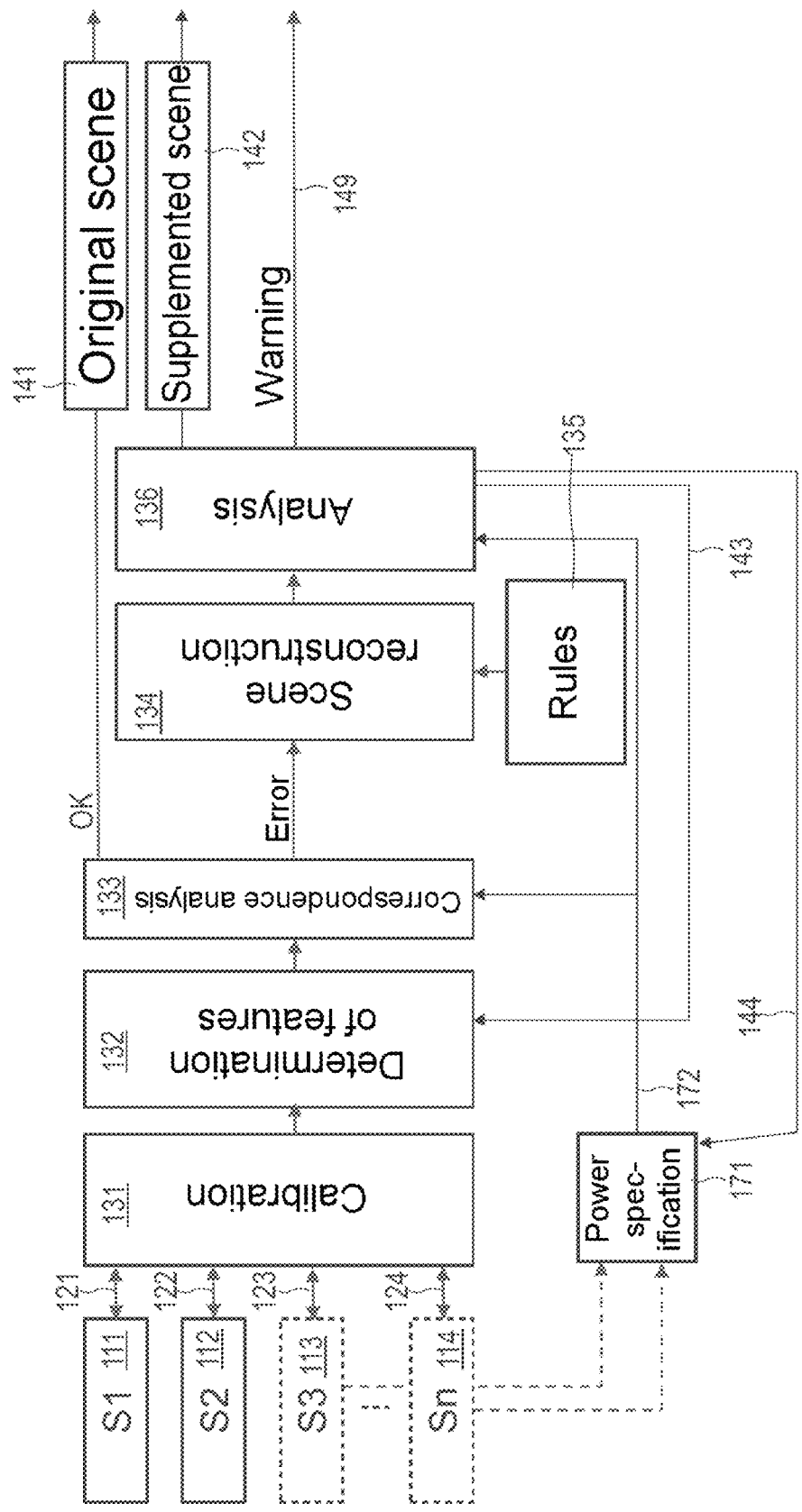
FIG. 2 schematically illustrates the exemplary processing of sensor data from sensors which capture the scene.

FIG. 2 Illustrates aspects with respect to the processing of the sensor data from the sensors 111, 112. In particular, FIG. 2 illustrates aspects with respect to sensor fusion for the sensors 111, 112.

The processing of the sensor data generally makes it possible to search for geometrical properties which correspond between the various sensor data or generally corresponding features. The plausibility of the various sensor data can be validated on the basis thereof. For example, the sensor 111 could be an ultrasonic sensor and could provide distance information. The sensor 112 could be a camera, for example, which provides an image having a plurality of image points. In this case, it would be possible for the contrast values of the various image points to also be associated with distance information. Such an item of depth image information from the camera 112 can then be used to explain the sensor data from the ultrasonic sensor 111. Discrepancies between features detected by the ultrasonic sensor 111 and features detected by the camera 112 can be detected, for example. If such discrepancies are detected, further processing or interpretation of the sensor data can be initiated, that is to say a scene reconstruction algorithm can be used, for example. Such techniques and further techniques are now described in detail in connection with FIG. 2.

In detail, FIG. 2 illustrates the fact that a variable number of sensors 111-114 transfer sensor data 121-124 to a calibration module 131 (typically implemented in software). The performance of a calibration, and therefore the calibration module 131, is generally optional. The calibration makes it possible to calibrate the sensors 111-114 in an automated, extrinsic manner. The calibration can be initiated on the basis of different events. For example, the calibration could be repeatedly initiated according to predefined scheduling. It would also be possible for the calibration to be initiated on the basis of the mutual correspondence analysis, for example if a number of discrepancies exceeds a threshold value. A further example of an event which can initiate the calibration relates to a collision of the robot 90 with an obstacle 81-83.

Calibration data can be determined by the calibration. The calibration data can describe imaging properties of the respective sensor 111-114, optionally taking into account the corresponding measurement modality. In one example, the calibration data could compensate, for example, for an offset of the measurement regions 211, 212 and/or a rotation of the measurement regions 211, 212 with respect to one another. The further processing of the sensor data 121-124, in particular the determination of features in the respective sensor data, can then be carried out on the basis of the calibration data. This means that the calibration can generally relate the sensor data from different sensors to one another.

Features in the sensor data 121-124 are then determined in module 132, optionally taking into account the calibration data. The module 132 may again be implemented in software. The features may describe particular characteristic properties of the sensor data. The features may correspond to the objects 81-83 in the scene 80.

Depending on the type of sensor 111-114 used, the information content of the sensor data may vary, as described above. Accordingly, the complexity of the determination of features may also vary depending on the type of sensor. For example, for ultrasonic sensors, the determination of features could comprise the determination of an individual distance value. On the other hand, for cameras, the determination of features could comprise object detection, for instance using machine learning and/or image segmentation.

It is generally possible for the at least one feature to be respectively determined on the basis of an individual measurement of the sensor data. This means that sensor data from a plurality of time-sequential measurements for the various sensors 111-124 are not combined. If individual measurements are used, it is possible to use a higher refresh rate for the downstream sensor fusion.

Correspondence analysis between the features of the various sensor data 121-124 is then carried out in module 133. This correspondence analysis is carried out taking into account performance specification data 172.

The correspondence analysis is carried out, in particular, mutually between the features of the various sensor data 121-124. This means that features determined in the sensor data 121, for example, can be checked for correspondence with features determined in the sensor data 122 and with features determined in the sensor data 123 and with features determined in the sensor data 124. Accordingly, the features determined in the sensor data 122 may in turn be checked for correspondence with features determined in the sensor data 123 etc.

In the example in FIG. 2, the performance specification data are received by a module 171. In some examples, the performance specification data may be permanently stored in a memory, that is to say predefined. The example in FIG. 2 also illustrates the fact that it may sometimes be possible to adapt the performance specification data during operation for the sensors 111-114. For example, particular operating states of the sensors 111-114, etc. can therefore be taken into account. This may be helpful, for example, if the measurement modalities of the sensors 111-114 can be set.

The sensor fusion can then be carried out on the basis of a result of the correspondence analysis. For example, if the correspondence analysis indicates good correspondence between the features determined in the various sensor data 121-124, the sensor fusion could be readily carried out by combining the various sensor data 121-124, that is to say by superimposing the various determined features, for example, which corresponds to output 141.

In the event of discrepancies which are detected during the correspondence analysis—that is to say in the event of discrepancies in the interpretation of the various sensor data 121-124 for example—a scene reconstruction algorithm can be used. In particular, the scene reconstruction algorithm can be used when the correspondence analysis indicates, as the result, limited correspondence which is, however, plausible within the scope of the corresponding performance specification data. If the correspondence is not plausible within the scope of the corresponding performance specification data, a defective sensor can be assumed.

During a scene reconstruction, particular typical assumptions can be made for the scene, for instance within the scope of reconstruction rules. For example, a pane of glass could be inserted into a frame detected by the camera 112. That is to say, particular features can be generally added, in particular when their absence in the corresponding sensor data 121-124 is plausible within the scope of the performance specification data. For example, in the example in FIG. 1, the pane of glass 82 could be added in connection with the set of features determined in the sensor data 122 from the camera 112.

For each scene assumption made, it could then be checked whether all of the sensor data can therefore be declared plausible, for instance a module 136. The performance specification data 172 can again be taken into account in this case. If, for example, a flat pane of glass is reconstructed and added in a frame detected by the camera 112, it can then be validated that the object 83 which is behind the pane of glass 82 is nevertheless determined as a feature in the sensor data 122 from the camera 112. This generally means that it is possible for the scene reconstruction algorithm to correct a limited correspondence on the basis of the predefined reconstruction rules for expected features of the scene. These reconstruction rules can describe, for example, a geometrical relationship between particular typical features, as described above. In the example in FIG. 2, the reconstruction rules are received from a module 135.

In some examples, it would be possible for the reconstruction rules to be trained on the basis of machine learning. For example, it would be possible—if a particularly plausible reconstruction of the scene is obtained by using particular variations of correspondence rules—for this information to be used to train a corresponding algorithm which provides the correspondence rules.

If the analysis in module 136 reveals a successful reconstruction of the scene, the sensor fusion can again be carried out by superimposing the features, including the features added by the scene reconstruction, which corresponds to output 142. In such a case, the supplemented scene or particular properties of the supplemented scene could also be used as a-priori knowledge for a subsequent determination of features 132 by feeding back corresponding a-priori data 143.

Results of the scene reconstruction 134 could also be used to adapt the performance specification data 172. Therefore, corresponding correction data 144 can be output to the module 171.

If a plausible reconstruction of the scene is not possible, a warning 149 can be output.

By means of such techniques, it is therefore possible to robustly interpret the scene—that is to say the environment. It may be possible, in particular, to combine all available sensor data, possibly with assumptions for typical features during the scene reconstruction. Such sensor fusion provides a detailed image of the scene. The high degree of detail results in fewer spatial limitations. This may be helpful, for example, in particular in connection with the planning of trajectories 91 (compare FIG. 1). For example, in scenes with objects such as a door frame, obstacles which are close together such as posts, etc., the environment can be correctly interpreted, thus enabling passage.

Figure 3:
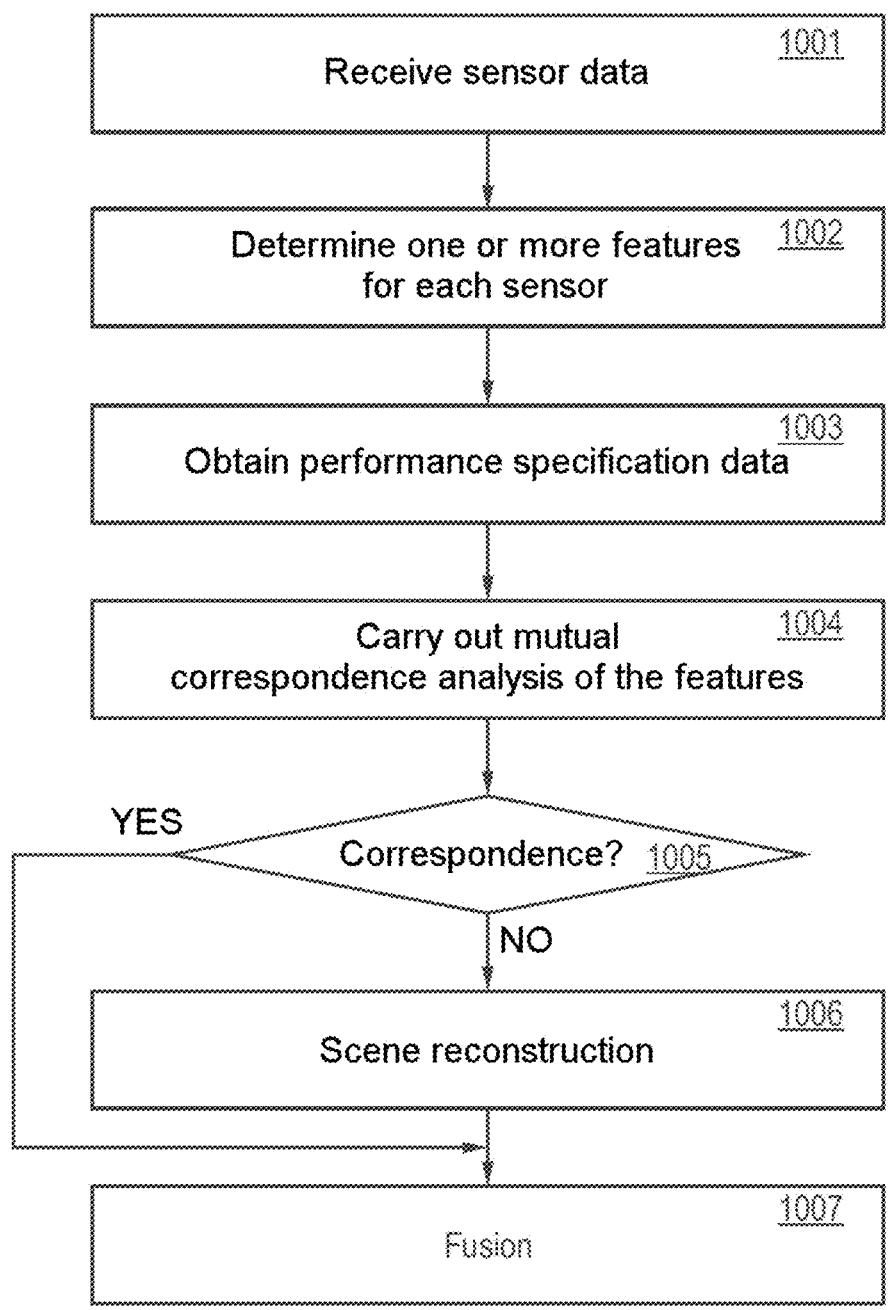
FIG. 3 is a flowchart of one exemplary method.

FIG. 3 is a flowchart of one exemplary method. For example, the method according to FIG. 3 could be implemented on a processor by virtue of the latter reading the program code from a memory. The method in accordance with the example in FIG. 3 is used to robustly find features in a scene on the basis of multimodal sensor data.

Sensor data are first of all received in block 1001. In this case, it is generally possible for the sensor data to be received from at least two different sensors, that is to say sensors which are assigned to different sensor types. The various sensors may image a common scene using different modalities. For example, sensor data could be received from a camera and further sensor data could be received from an ultrasonic sensor.

One or more features are then respectively determined in block 1002 on the basis of the sensor data. The evaluation in block 1002 can be initially carried out separately for the different available sensor data. In particular, it may be possible to take calibration data into account in block 1002. These calibration data can relate the different sensor data to one another. For this purpose, the calibration data can describe imaging properties of the respective sensor, for example a pose, a magnification factor, a latency, an image refresh rate, etc.

Performance specification data for each sensor are then obtained in block 1003. The performance specification data are indicative of at least one limitation of the respective measurement modality in connection with the ability of the corresponding sensor to image features with particular properties.

Mutual correspondence analysis of the features is then carried out in block 1004, wherein the corresponding performance specification data are taken into account in this case. This may mean that corresponding features are found in the sensor data from the different sensors. The features determined in the different sensor data may therefore be related or assigned to one another.

In this case, the performance specification data for the various sensors support the correspondence analysis and make it possible to more accurately assess discrepancies identified during the correspondence analysis. For example, the performance specification data could determine boundaries of overlapping measurement fields of the different sensors. For example, the performance specification data could determine requirements imposed on a geometry of an object, that is to say, for example, the surface orientation or the distance to the sensor, with the result that the object can be detected as a feature.

The result of the correspondence analysis is then checked in block 1005. If there is correspondence, the sensor fusion can be directly carried out in block 1007. The various features determined can be superimposed for this purpose. The presence of correspondence can be determined, for example, when all features of the sensor data from a sensor correspond to the features of the other sensor data (within particular accuracy limits).

However, if there is no correspondence, block 1006 can be first of all carried out before carrying out the sensor fusion in block 1007. A scene reconstruction algorithm is used in block 1006. This algorithm can be used to reconstruct particular features for which there is no correspondence. In this case, block 1007 can be carried out, in particular, when, although there is no correspondence, the lack of correspondence is plausible within the limitations indicated by the performance specification data (otherwise, a warning could be output, not illustrated in FIG. 3).

In connection with the scene reconstruction algorithm, a-priori assumptions relating to the scene can be used, for instance within the scope of reconstruction rules. For example, the a-priori assumptions could comprise an item of information relating to the field of use, for instance whether an interior scene or an exterior scene is involved, etc. Typical objects which occur frequently and can be detected only with difficulty by a particular sensor type can therefore be reconstructed more efficiently. For example, panes of glass in a frame or characteristic bases/linings which are highly absorbent or are shiny.

Machine learning methods can also be used as part of the scene reconstruction algorithm. For example, correspondence rules which describe the reconstruction of features can be trained on the basis of machine learning. This enables a more robust and more efficient reconstruction of the environment.

Particular results of the scene reconstruction algorithm can also be used further. For example, the performance specification data could be adapted on the basis of a result of the scene reconstruction algorithm. Specifically, if it is detected, for example, that a particular feature has not been detected in particular sensor data and this feature is reconstructed, properties of this feature can be stored in the performance specification data as not being detectable by the corresponding sensor type. Such feedback can be implemented, for example, using machine learning, in particular reinforced learning.

The results of the scene reconstruction algorithm can also be used to detect systematic faults, for example on the basis of an increasing frequency of discrepancies.

It goes without saying that the features of the embodiments and aspects of the invention described above can be combined with one another. In particular, the features can be used not only in the combinations described but also in other combinations or on their own without departing from the scope of the invention.

The invention claimed is:

1. A computer-implemented sensor fusion method, wherein the method comprises:
   receiving sensor data from a multiplicity of sensors, wherein the multiplicity of sensors image a common scene using a multiplicity of measurement modalities, wherein the multiplicity of sensors comprise at least a first sensor providing first sensor data and a second sensor providing second sensor data,
   for each sensor of the multiplicity of sensors: determining at least one corresponding feature in the respective sensor data,
   for each sensor of the multiplicity of sensors: obtaining corresponding performance specification data,
   carrying out a mutual correspondence analysis at least between first features of the first sensor data and second features of the second sensor data taking into account the corresponding performance specification data of the first sensor and the second sensor, the mutual correspondence analysis determining whether, for one or more of the first features that are selected in accordance with the performance specification data, a corresponding one of the second features is present or whether a corresponding one of the second features is absent, and carrying out the sensor fusion on the basis of a result of the correspondence analysis.

2. The method as claimed in claim 1,
wherein the performance specification data are indicative of at least one limitation of the respective measurement modality for imaging features with particular properties.

3. The method as claimed in claim 2,
wherein the at least one limitation comprises a lower threshold value for a lateral extent of objects in the scene.

4. The method as claimed in claim 2,
wherein the at least one limitation comprises a geometrical orientation of objects in the scene on the basis of a pose of the corresponding sensor with respect to the object.

5. The method as claimed in any one of claim 2,
wherein the at least one limitation comprises a reflectivity of a surface of an object in the scene.

6. The method as claimed in claim 1,
wherein the at least one feature is respectively determined on the basis of an individual measurement of the sensor data.

7. A computer-implemented sensor fusion method, wherein the method comprises:
receiving sensor data from a multiplicity of sensors, wherein the multiplicity of sensors image a common scene using a multiplicity of measurement modalities,
for each sensor of the multiplicity of sensors: determining at least one corresponding feature in the respective sensor data,
for each sensor of the multiplicity of sensors: obtaining corresponding performance specification data,
carrying out mutual correspondence analysis between the features of the sensor data taking into account the corresponding performance specification data,
carrying out the sensor fusion on the basis of the correspondence analysis
if the correspondence analysis indicates, as the result, a limited correspondence which is plausible within the scope of the corresponding performance specification data: using a scene reconstruction algorithm.

8. The method as claimed in claim 7,
wherein the scene reconstruction algorithm corrects the limited correspondence on the basis of predefined reconstruction rules for expected features of the scene.

9. The method as claimed in claim 8,
wherein the predefined reconstruction rules are trained on the basis of machine learning.

10. The method as claimed in claim 8,
wherein the correspondence rules are varied in a plurality of iterations of the scene reconstruction algorithm until an abort criterion has been satisfied,
wherein the abort criterion comprises a plausibility of a result of the scene reconstruction algorithm on the basis of the sensor data.

11. The method as claimed in any claim 7, furthermore comprising:
adapting the performance specification data on the basis of a result of the scene reconstruction algorithm.

12. The method as claimed in claim 7,
wherein the scene reconstruction algorithm uses a-priori assumptions relating to the scene.

13. The method as claimed in claim 1,
wherein the at least one corresponding feature is determined for a respective sensor of the multiplicity of sensors on the basis of respective calibration data, wherein the calibration data describe imaging properties of the respective sensor.

14. The method as claimed in claim 1, furthermore comprising:
controlling the movement of a robot in the scene on the basis of sensor fusion.

15. An apparatus having at least one processor and a memory, wherein the at least one processor is configured to load a program code from the memory and to execute it and to carry out the following steps on the basis of the execution of the program code:
receiving sensor data from a multiplicity of sensors, wherein the multiplicity of sensors image a common scene using a multiplicity of measurement modalities, wherein the multiplicity of sensors comprise at least a first sensor providing first sensor data and a second sensor providing second sensor data,
for each sensor of the multiplicity of sensors: determining at least one corresponding feature in the respective sensor data,
for each sensor of the multiplicity of sensors: obtaining corresponding performance specification data,
carrying out a mutual correspondence analysis between at least first features of the first sensor data and second features of the second sensor data taking into account the corresponding performance specification data of the first sensor and the second sensor, the mutual correspondence analysis determining whether, for one or more of the first features that are selected in accordance with the performance specification data, a corresponding one of the second features is present or whether a corresponding one of the second features is absent, and
carrying out the sensor fusion on the basis of a result of the correspondence analysis.

16. A computer-implemented sensor fusion method, wherein the method comprises:
receiving sensor data from a multiplicity of sensors, wherein the multiplicity of sensors image a common scene using a multiplicity of measurement modalities,
for each sensor of the multiplicity of sensors: determining at least one corresponding feature in the respective sensor data,
for each sensor of the multiplicity of sensors: obtaining corresponding performance specification data, wherein the performance specification data are indicative of at least one limitation of the respective measurement modality for imaging features with particular properties, wherein the at least one limitation comprises at least one of a lower threshold value for a lateral extent of objects in the scene, a geometrical orientation of objects in the scene on the basis of a post of the corresponding sensor with respect to the object, or a reflectivity of a surface of an object in the scene,
carrying out mutual correspondence analysis between the features of the sensor data taking into account the corresponding performance specification data, and
carrying out the sensor fusion on the basis of the correspondence analysis.

* * * * *